R. T. OSGOOD.
Harvester-Rake.
No. { 147, / 1,250. }
Reissued Dec. 24, 1861.
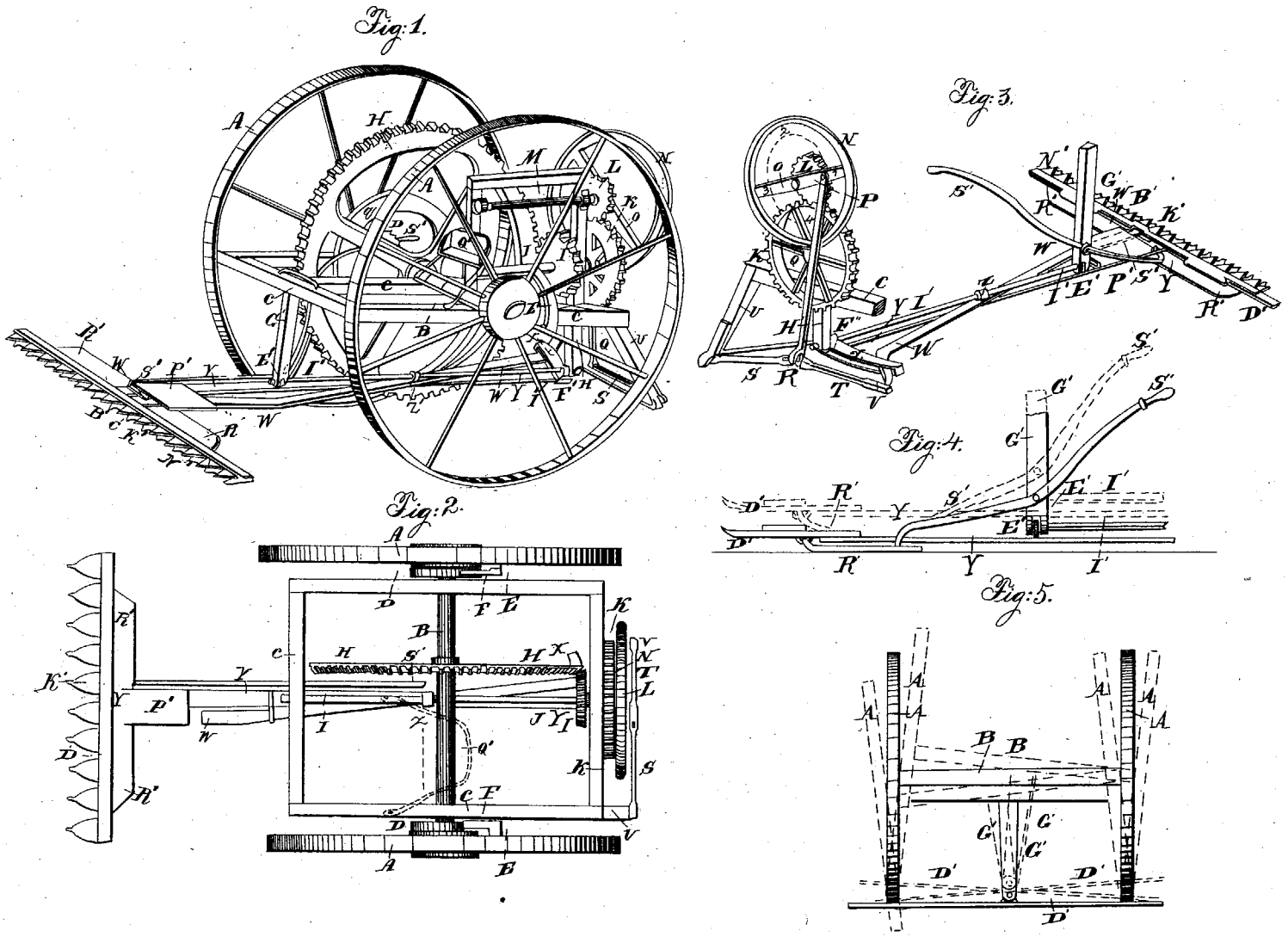
N. PETERS, PHOTO-LITHOGRAPHER, WASHINGTON, D. C.

UNITED STATES PATENT OFFICE.

CYRENUS WHEELER, JR., OF POPLAR RIDGE, NEW YORK, ASSIGNEE OF ROBERT T. OSGOOD.

IMPROVEMENT IN GRAIN AND GRASS HARVESTERS.

Specification forming part of Letters Patent No. 8,743, dated February 17, 1852; Reissue No. 1,250, dated December 24, 1861.

*To all whom it may concern:*

Be it known that ROBERT T. OSGOOD, of Orland, in the county of Hancock, in the State of Maine, invented certain new and useful Improvements in Machines for Harvesting Grain and Grass, of which the following is a full, clear, and exact description, reference being had to the annexed drawings, which make a part of this specification, and in which—

Figure 1 represents a perspective view of the machine as adapted to the harvesting of grass. Fig. 2 represents a top plan of the machine as adapted to the cutting of grass, the tongue by which the machine is drawn being omitted in both figures. Fig. 3 represents in perspective a view of the cutting apparatus and gearing by which it is driven detached from the other parts of the machine. Fig. 4 represents detached from the machine the cutting apparatus, hinged shoe, and lever by which said cutting apparatus may be raised and lowered, these parts being shown in two positions by red and black lines. Fig. 5 is designed to illustrate how the finger-beam may assume such positions as will conform to the surface of the ground over which it passes without being influenced by the position of the main wheels, and also how the main wheels may rise over obstructions or drop into depressions without influencing the finger-bar, thus allowing each to conform to the surface of the ground over which they are passing without in any way influencing the other injuriously.

In these drawings the reel, the platform, and the rake are omitted or removed, to represent the machine as capable of cutting grass. They are so made and arranged as that these parts may be taken off and put on at pleasure.

In the construction of a grain and grass harvesting machine known as a "combined reaper and mower" there are many separate features that must be adaptable to both reaping and mowing, the conditions of each operation varying with the material to be cut and the nature of the ground over which the machine is to be operated. For cutting grain the cutters are raised some distance above the ground, and to the cutters an addition of some kind must be made to receive the cut grain and from which it is delivered in proper shape for binding into sheaves. In cutting grass, however, it is desirable that it should be left spread on the ground for the purpose of curing. To do this the grain-receptacle should be so made and attached as to be readily and easily removed, and the cutting apparatus should be capable of being brought close to so as to travel on or near the ground and conforming to its surface, and while thus conforming to the surface of the ground the cutters should vibrate with a nearly-uniform motion, whether the machine is moving in a direct line or on a curve to the right or to the left. To construct such a machine as is adaptable both to the mowing of grass and to the reaping of grain, and be susceptible of the necessary adjustments for each separate purpose, constitutes the general characteristics of this invention, the separate divisions of which will be separately described hereinafter under their distinctive and appropriate heads, some of the branches of which will form the subject-matter of separate applications for Letters Patent under a division of the original invention. It is obvious that individual or several of the parts of the aforesaid original invention are applicable to various other reaping and mowing machines. One mode of applying each of these improvements to practical use is described or represented. It is therefore unnecessary to specify the manner of applying the parts respectively to other machines, as the ordinary skill of the constructer is sufficient for the purpose.

In mowing grass it is desirable to have it cut with a uniform height of stubble. A skillful hand with the scythe can cut grass with a good degree of uniformity on any ground that can be mown, and with a grain cradle or sickle can cut grain on any ground on which it can be grown; but his progress in either case must necessarily be slow, and his work laborious, and as time is more valuable at the harvest season of the year these modes of harvesting are very expensive.

Machines have been constructed for mowing and reaping that will operate very well on comparatively level ground; but as heretofore constructed they have not carried their cutting apparatus in a way that left it free enough to conform to the surface of uneven ground, and have been objectionable from the too great weight required to give the driving-wheels the necessary tractive force to drive the cutters, and as a large proportion of the grass and grain lands are rolling and uneven the use of machines on such lands has been very limited, and when used it has been under great disadvantage.

In a machine having two supporting-wheels for the main frame, if used on rolling, uneven ground, it will necessarily be changing its position continually, by which change the center of gravity is constantly changing from one side of the machine to the other, as one wheel or the other rises above or falls below a horizontal plane. Consequently a greater proportion of the weight of the frame and gearing is thrown upon that wheel which for the time being is lowest, thereby relieving the other wheel of its due proportion of the burden, and when the wheel that serves as a driver to vibrate the cutters is much higher than the other it is so much relieved of its proportion of the burden (unless made excessively heavy) that it will not have sufficient tractive adhesion to the ground to drive the cutters, and they will become clogged or a balk will be made, whereas if both were driving-wheels the diminished power of the one would be compensated for by the increased power of the other.

To overcome the difficulties mentioned and to secure the desired results is the object of this branch of the invention; and the nature of the invention consists in arranging two main supporting-wheels on a common axle, and making both of them driving-wheels, and suspending a rectangular main frame on said axle between said wheels, and nearly or quite balanced thereon, with a cutting apparatus hinged to said main frame, so as to conform freely to the surface of sloping or uneven ground, and so as to travel as nearly parallel thereto as possible under all circumstances. It is not only desirable that the main frame and gearing should be supported and perfectly balanced, or nearly so, on two wheels, but that both of the supporting-wheels should act as driving-wheels, and that they should act independently of each other, to do which their connection with the gearing must be such that their own motions will connect and disconnect them with the gearing, so that when the machine or either of the wheels is advanced the cutters will vibrate, and when the machine is backed the cutters will cease to vibrate, and thus, acting independently of each other, the main wheels permit the machine to be turned around easily to change its direction. It is also important that the means of connection should be both simple and effective as well as entirely reliable.

To secure these results is the object of this branch of the invention; and the invention consists in connection with a balanced or nearly-balanced main frame, the mounting of two driving-wheels, and one main gear-wheel on a common axle, in combination with a ratchet-wheel for each driving-wheel rigidly affixed to the axle, so that a pawl connected to and carried by each driving-wheel will lock the driving-wheels to the ratchet-wheels, and cause the axle and main gear-wheel to revolve when the machine is drawn forward and unlock and release them, so that the gearing will not revolve when the machine is backed.

In hinging a cutting apparatus to the main frame, if the hinges are connected to the main frame too high up, the lateral sway of the main frame as it rises and falls at either side, by the passage of the wheels over inequalities, will impart an injurious motion to the cutting apparatus by moving it endwise back and forth a distance equal to the lateral movements of the main frame at its point of connection therewith. To overcome this tendency the inventor of the within-described machine has provided down-hangers which bring the hinges below the main frame, and serve as a point of attachment for the cutting apparatus, and this constitutes the nature of this part of his invention.

As the cutting apparatus must be sustained and carried forward over the ground by the main frame, it will not only be required to withstand the strain of the ordinary performance of the work, but must be capable of enduring the shocks that it will receive from obstructions that it is liable to meet with. To enable the main frame to withstand its ordinary strain as well as the sudden shocks or jars that will be imparted to it through the cutting apparatus, and at the same time afford a broad bracing-surface on a short main frame, the inventor has arranged the hinges that connect the cutting apparatus to the main frame on opposite sides of the center of motion and at opposite ends of the main frame; and in order, further, that the motions of the cutting apparatus may be free he has given the hinges a common center of motion, though arranged at opposite ends of the main frame. This constitutes the nature of this part of the invention.

To give the necessary vibrations to the cutters, and at the same time employ less gearing, the inventor has so connected the cutters with the crank that four vibrations of the cutters are obtained by one revolution of the crank. This constitutes the nature of this part of the invention.

To give steadiness to the motions of the gearing, and enable it the better to withstand the sudden shocks imparted to it by sticks, stones, or other hard substances getting between the cutters when in operation, the inventor has combined and arranged a balance-wheel, so as to equalize the motion of the cutters and gearing, and relieve the gearing from the injurious effect of such sudden shocks and jarrings; and this constitutes the nature of this part of the invention.

That the main frame may be properly supported with the gearing that it carries, and at the same time be free to oscillate on the main axle, while the cutting apparatus is free to oscillate in a direction at right angles to that of the main frame, the inventor has arranged and combined a hinged tongue, a main frame, two supporting-wheels, and a hinged cutting apparatus; and this constitutes the nature of this part of the invention.

While it is very desirable to have the cutting apparatus travel as close to the ground as the condition of the crop, the nature of the ground, and the safety of the cutters will permit, still there are times when it is important to have the cutters carried higher than at other times, as in mowing newly-seeded pieces of ground, or on pieces covered with small stones, or hummocks, or in harvesting grain when a higher stubble is desirable. To accomplish these objects the inventor has constructed an adjustable sole or shoe, and so connected it with the beam by hinges that the cutters can be set to cut at different heights, and this constitutes the nature of this part of the invention.

It is desirable and indeed almost indispensable that the adjustment of the cutters may be made while the machine is in motion, so that the operator in his seat on the machine may elevate the cutters and pass obstructions met with that would otherwise involve the necessity of stopping the machine and dismounting to raise the cutting apparatus over them, or of changing the course of the machine to avoid them. To accomplish this object the inventor has arranged and combined a lever with the sole or shoe, so that the driver can raise or lower the beam and cutting apparatus at pleasure; and this constitutes the nature of this part of the invention.

To enable others skilled in the art to make and use this invention, I will proceed to describe the same in connection with the drawings.

A A are two main driving and supporting wheels of the same size, and loosely affixed on the opposite ends of the shaft or axle B, which is connected to the main frame C by suitable bearings or boxes in which it revolves. The main frame C is of rectangular form, and is suspended between the main wheels A, and is nearly balanced on the axle B, on which it freely oscillates.

To the main axle B, on each side of the main frame and between it and the driving-wheels, are rigidly affixed two ratchet-wheels, D, having notches or teeth in their peripheries.

On the inner side of the main wheels A are connected webs or projections E, which carry dogs or pawls F, that are so set as to take into the notches of the ratchet-wheels D, when the machine is moved forward and slip over the notches when the machine is backed. Each dog or pawl F has a spring, G, which presses upon them with sufficient force to insure at all times their taking into the notches of the ratchets when the machine is advanced, and with sufficient elasticity to yield and allow the pawls to slip over the notches when the machine is backed.

To the main shaft B is firmly fastened a main gear-wheel, H, which revolves with the shaft. With this wheel H a pinion, I, on the shaft J gears, said shaft being supported in suitable bearings.

On the outer end of the shaft J is rigidly affixed a gear-wheel, K, which gears with a pinion, L, on a shaft, M, which has also suitable bearings to turn in.

To the extreme outer end of the shaft M is affixed a balance-wheel, N, crossed by arms O, to one of which is attached a wrist or crank pin, P, to which is connected one end of a pitman, Q, the other end of said pitman being connected at R to the toggle-levers or links S and T. One end of the link S is pivoted to the lower end of the down-hanger U, which is fastened at its upper end to the rear left corner of the main frame C. The other end of the link S is hinged to the pitman Q. The link T at its inner end is attached to the pitman at R, and its other end has a hinged piece, V, connected with it, which pivots on the rear end of the vibrating lever W. By means of the hinged piece V and its connection with the link or lever T and vibrating lever W two hinged connections are formed at right angles to each other, thus permitting the vibrating lever W to move in the arc of a circle, while the toggle lever or link T can move in the arc of another circle at right angles to that of the vibrating lever W, thus preventing the torsion that would occur to the vibrating lever T and its connections, if the toggle-link were made fast to the lever by a single hinge only. The vibrating lever W plays at its rear end in a slotted guide, X, which guide is secured to the rear end of the coupling-arm Y. The vibrating lever W is pivoted at Z to the coupling-arm Y, and has its front end pivoted to the cutter-bar C′ at B′.

The cutters are of the ordinary scalloped form and fastened to the bar C′ in the usual manner, and rest upon and vibrate over a series of fingers, K′, which are connected with and supported by the beam D′ in the ordinary manner. The cutters N′ receive their vibratory movement from one or both of the main wheels A A through the gearing and connections above described. The finger-beam D′ supports and carries the cutters, and to this finger-beam is connected the coupling-arm Y, which extends under the main frame, and is connected therewith by hinges E′ F′, uniting it to the down-hangers G′ H′.

This machine is to reap as well as mow, and when reaping the apron and receptacle for the grain must be supported and sustained by the coupling-arm and finger-beam.

The tongue by which the machine is guided and drawn has been purposely omitted in the drawings; but that it may not restrain the free motion of the main frame on the main axle it should be connected to the front end of the main frame by eyebolts or hinges, so that the team can travel beside the standing grass or grain and in the swath previously cut, and thus, while the team, by means of the draft-pole, move the machine forward and steady it laterally, its hinged connection therewith leaves it free to oscillate up and down at its front end. The power required to vibrate the cutters is exerted in a direction (through the main wheel and gearing) to oscillate the main frame in a downward direction at its forward end, the main frame and gearing, with the cutting apparatus, being so balanced as to allow the cutting apparatus to ride easily over the ground. The progressive movement of the main frame on its wheels carries forward the coupling-arm and cutting apparatus, and as the main frame is free to oscillate on its axle the beam that carries the cutters necessarily rests upon the ground, and being free to rise and fall at either or both ends, by means of its hinges, it conforms readily and uniformly to the varying inclinations of the surface of the ground, while the two driving-wheels, which support the main frame by means of their ratchets and pawls, act together or independently of each other in vibrating the cutters, as circumstances may require.

The down-hangers G′ H′ extend downward from the main frame C, and serve as a point of attachment for the hinges E′ and F′, which sustain the cutting apparatus. These down-hangers are placed at opposite ends of the main frame, so as to bring the hinges of the cutting apparatus on opposite sides of the main axle, to give a greater breadth of bracing surface for the coupling-arm Y, and to throw the strain of the cutting apparatus on opposite ends of the main frame. It will also be observed that the hinges E′ and F′ have a common center or axis of motion.

The manner of obtaining four vibrations of the cutters to one revolution of the crank is as follows: Assuming the starting-point to be at 1 in Fig. 3, when the wrist-pin arrives at 2 there will have been one vibration of the cutters; when it arrives at the point 3 there will have been two vibrations; when it arrives at the point 4 there will have been three vibrations; and, finally, when it again arrives at 1, the starting-point, there will have been four vibrations of the cutters, every quarter-revolution of the crank-wheel through its pitman and toggle-lever connection with the cutters causing a vibration of the cutters.

R′ is an adjustable sole, hinged to the finger-beam D′ and extending under and back of it, so that by pressing down its rear part the beam and cutters are raised from the ground.

S is a lever the lower end of which rests on the upper side of the rear edge of the sole. The other end of the lever extends upward and backward to near the driver's seat. This lever has a pivoted connection with down-hanger G′, so that the driver can, by carrying the upper end of the lever from him, force down its opposite end and with it the heel of the sole, and thereby raise the beam and cutters, or by the reverse movement lower them at pleasure, the ground serving as the fulcrum by which the finger-bar is raised and lowered.

Having thus fully described the nature and object of the invention, what is claimed under this patent as the invention of the said ROBERT T. OSGOOD is—

1. Two independent driving and supporting wheels on a common axle, carrying a rectangular main frame located between said wheels, and suspended from and nearly balanced on said axle, in combination with the cutting apparatus hinged to said main frame, substantially as described.

2. Balancing the main frame and mounting the two driving and one main gear wheel on a common axle, in combination with a ratchet-wheel for each driving-wheel rigidly affixed to the axle, each driving-wheel carrying a pawl that will stand in gear with its ratchet-wheel when the machine is advanced and out of gear when the machine is backed, substantially as set forth and described.

3. The down-hangers as points of attachment for the hinges, and to bring the hinges below the main frame, substantially as described.

4. Arranging the hinges by which the finger-beam is connected to the main frame, and thus advanced over the ground on opposite sides of the center of motion and at opposite ends of the main frame, substantially as and for the purpose set forth.

5. Giving the hinges by which the finger-beam is thus connected and advanced over the ground a common center or axis of motion, though located at opposite ends of the main frame, substantially as described.

6. So connecting the cutters with the crank that four vibrations of the cutters will be given for every single revolution of the crank, substantially as described.

7. In combination with two independent driving-wheels and a hinged cutting apparatus, a balance-wheel to equalize the motions of the cutters and give steadiness of motion to the gearing, substantially as described.

8. The combination, in a harvesting-machine, substantially as described, of the hinged tongue, the main frame, two main supporting-wheels, and the hinged cutting apparatus, for the purpose set forth.

9. In combination with a finger-beam, an adjustable sole, substantially as described.

10. In combination with a finger-beam and an adjustable sole, a lever so arranged that the driver can by it, when in his seat and with the machine in motion, raise or depress the cutting apparatus at pleasure, substantially as and for the purpose described.

CYRENUS WHEELER, JR.

Witnesses:
L. A. PRATT,
CHAS. CAMPBELL.